United States Patent

Thomas et al.

Patent Number: 5,469,617
Date of Patent: Nov. 28, 1995

[54] FRICTION FORMING

[75] Inventors: Wayne M. Thomas; Edward D. Nicholas, both of Haverhill; Stephen B. Jones, Stapleford, all of England; Roger H. Lilley, Comberton, United Kingdom; Christopher J. Dawes, Sawston, United Kingdom; Richard E. Dolby, Burwell, United Kingdom

[73] Assignee: The Welding Institute, Cambridge, England

[21] Appl. No.: 204,157

[22] PCT Filed: Aug. 21, 1992

[86] PCT No.: PCT/GB92/01540
§ 371 Date: Mar. 2, 1994
§ 102(e) Date: Mar. 2, 1994

[87] PCT Pub. No.: WO93/04813
PCT Pub. Date: Mar. 18, 1993

[30] Foreign Application Priority Data

Sep. 5, 1991 [GB] United Kingdom ............ 9119022

[51] Int. Cl.⁶ ............................................. B23K 20/12
[52] U.S. Cl. ................... 29/889.21; 228/114.5; 228/119; 164/80; 164/108
[58] Field of Search .............. 29/889.21; 228/119, 228/114.5, 215; 164/80, 108, 112

[56] References Cited

U.S. PATENT DOCUMENTS

| Re. 16,599 | 4/1927 | Mattice | 228/119 |
| 2,473,887 | 6/1949 | Jennings et al. | 228/215 |
| 3,444,611 | 5/1969 | Bogart | 228/114.5 |
| 3,487,530 | 1/1970 | Ely | 228/119 |
| 3,495,321 | 2/1970 | Shaff et al. | 29/470 |
| 4,592,120 | 6/1986 | Egan et al. | 29/889.21 |
| 5,262,123 | 11/1993 | Thomas et al. | 419/67 |

FOREIGN PATENT DOCUMENTS

| 0460900A2 | 11/1991 | European Pat. Off. |
| 572789 | 10/1945 | United Kingdom. |
| 1457600 | 12/1976 | United Kingdom. |
| 2233923 | 1/1991 | United Kingdom. |
| 1208 | 7/1991 | United Kingdom. |

Primary Examiner—Kenneth J. Ramsey
Attorney, Agent, or Firm—Martin M. Novack

[57] ABSTRACT

A method of forming a plug-like member comprises placing a consumable member (4) in a bore (1) of a workpiece (2). The consumable member (4) is rotated relative to the workpiece (2) while they are urged together so as to generate frictional heat and the formation of plasticised material (5). The plasticised material (5) is allowed to solidify so as to form a plug-like member having an outer surface conforming to the inner surface of at least part of the bore (1). The plug-like member is either left in situ or, following formation of the complete plug-like member, removed from the workpiece.

22 Claims, 8 Drawing Sheets

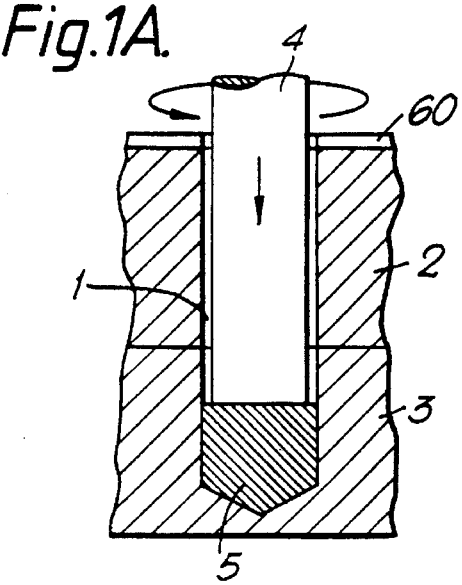
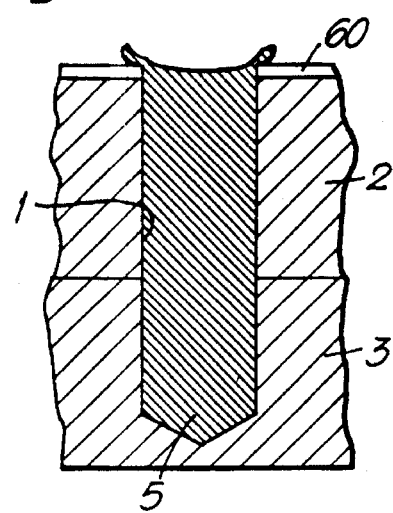
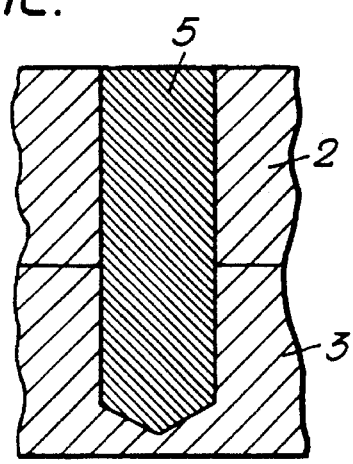
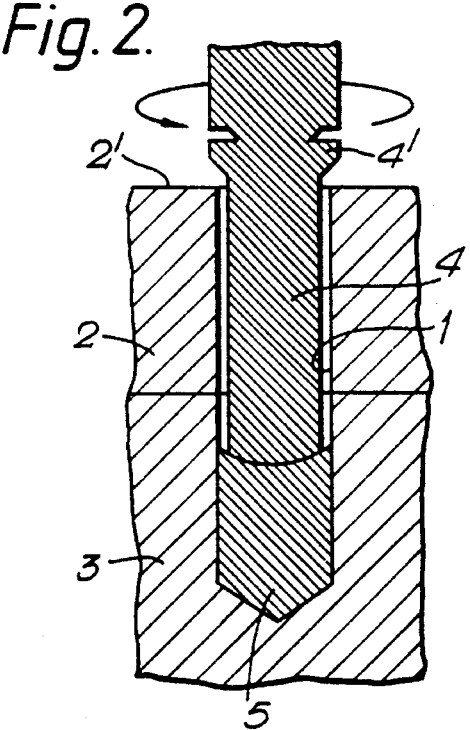
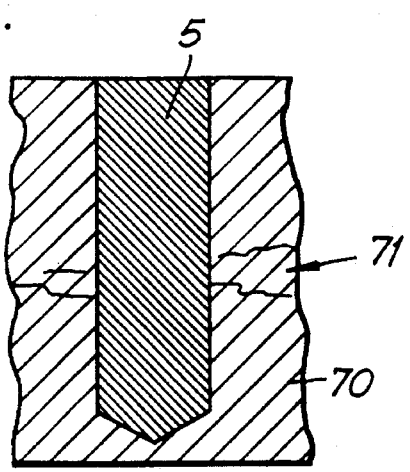

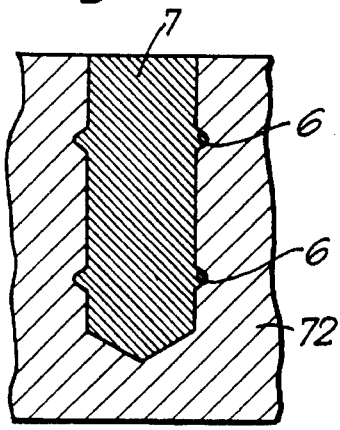
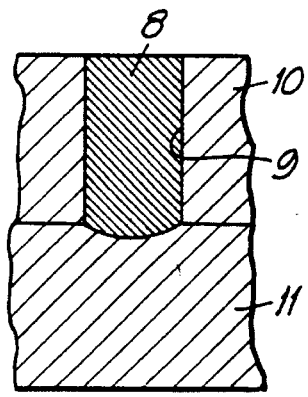
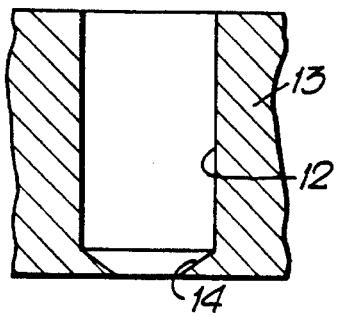
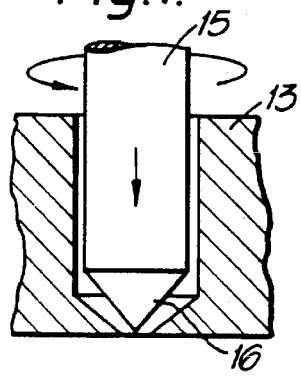
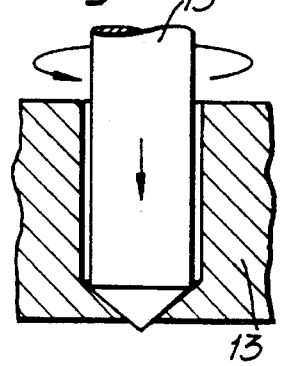
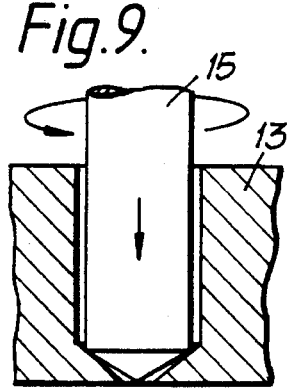
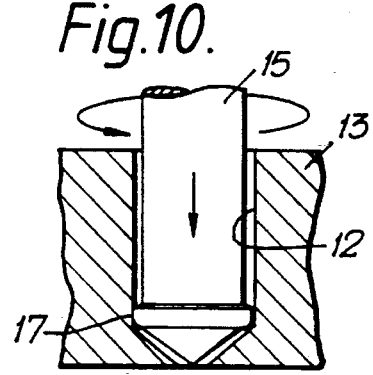
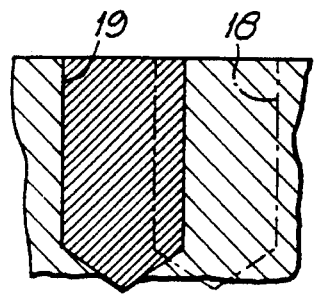
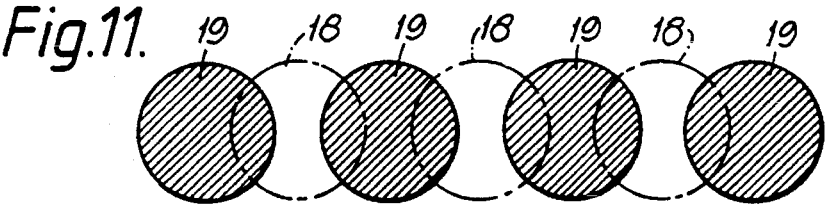

FRICTION FORMING

The invention relates to friction forming.

In friction welding as is well known, two members generally circular in the form of rods or tubes are pressed together while undergoing relative rotation such that the abutting ends are heated and in due course are displaced from the common interface. With continued relative movement and applied load a plasticised layer develops in the common interface which continues to be regularly extruded forming a flash or collar about the components. With tubes, the flash develops on the inside as well as the outside surfaces. By arresting the relative rotation while maintaining or even increasing the applied load between the components the plasticised layer is partially extruded from the interfacial region while a consolidated forge type weld is completed between the components. It is noted that the plasticised material forming the flash or collar about the components being joined does not contribute significantly per se to the joint formed and is often machined or cut off to leave a nominally flush finish. This friction technique is also used in a stud to plate configuration where in general it is preferable to develop plasticised material from both the plate substrate as well as the stud. With dissimilar materials the plasticised layer is developed principally from the material with the lower hot strength, although in general a solid phase bond is formed.

Attempts have been made in the past to utilize the flash which is inevitably formed during the friction welding process. For example, D. R. Andrews and M. J. Gilpin in an article entitled "Friction Forming—A Preliminary Study" in the Metallurgist and Materials Technologist, July 1975, pages 355–358 describe a form of hot forging using a frictional process to develop heat in the material to be forged in order to shape the component by using a die to shape flash formed when a component is urged against a friction plate. It is suggested that this process could be used for the shaping of bolts, pump impellers, valve stems and the like. This process has never been commercialised and is of limited use in simply providing a die to accommodate and shape the flash which is produced.

In accordance with the present invention, a method of forming a plug-like member comprises placing a consumable member in a bore of a substrate; causing relative movement between the consumable member and the substrate while urging them together to generate frictional heat and form a plasticised region which progresses along the consumable member in a direction opposite to the urging direction, allowing the plasticised material to solidify so as to form the plug like member having an outer surface conforming to the inner surface of at least part of the bore; and either leaving the plug-like member in situ or, following formation of the complete plug-like member, removing the substrate.

We have devised a new technique which has a wide variety of applications in which plug-like members of a variety of constitutions can be formed as will be explained below.

The invention should be contrasted with the hot forging and shaping technique described above. The invention is not concerned with simply accommodating and shaping the flash which is produced but causes the consumable member to be fully plasticised across the bore of the workpiece resulting in a generally uniform and integrated structure. It is a characteristic of the invention that the frictional plane rises up the consumable member whereas in the Andrews et al approach the plane is substantially fixed. Furthermore, as explained below, most of the applications being mentioned involve leaving a plug-like member in situ whereas in the hot forging process the intention is to separate the friction plate and die from the material.

The plasticised material will develop at a rate faster than the feed rate of the consumable member. The consumable member is forced into the configuration of the surrounding cavity or bore to entrap the new plasticised material as it is being formed to result in a plug in the cavity concerned.

In some cases the substrate comprises more than one member, and for example the plug may be utilised to join two or more sheets together in the sense of a one-sided rivet or equally to join together the separations in a single plate of material which is subject to laminar separation. The plug can be used to join together two separate components which have been initially abutted and drilled to form a common cavity. In these cases the plug remains in situ in the substrate. The outline of the bore or cavity may contain one or more re-entrant grooves or notches whereby the plasticised material in flowing into these recesses provides a further locking due to the geometric shapes. Furthermore the plasticised material may, for example, entrap (but not necessarily bond to) blades which are held in a mould comprising the substrate which mould is subsequently removed.

The invention is applicable to the manufacture of turbocharger fans, for example with ceramic blades for high temperature operation, and entrapped by the extruded plasticised material, and also to the manufacture of tools, rollers and gears.

Typically, the consumable member will have a solid cross-section but in some examples it could have an annular form and be used, for example, to provide a cladding around a shaft positioned within the bore or be used to generate a tubular plug-like member by positioning a reusable or sacrificial core within the bore.

Typically, the relative movement between the consumable member and the substrate comprises a rotary motion (usually of the consumable member) although other motions can be adopted such as orbital or oscillatory where the latter is particularly advantageous with a rectangular bar consumable member. Furthermore, the friction process can be utilised in the forming of compound materials such as metal matrix composites where the consumable member may comprise the matrix material or parent material with inserts of the particulate desired. This technique can also be used to refine for example MMC materials produced in prior stage or via an alternative process. For example, the method can be used to manufacture refined material in bar form round or even hexagonal, refined non-ferrous material, or refined MMC, i.e., the consolidation of spray formed or sintered material.

The invention enables plasticised material to be deposited to a thickness of at least 3 mm, at least 10 mm and at least 30 mm from continuous operation.

The method can be carried out in any suitable atmosphere, including underwater and a radioactive environment.

Some examples of methods according to the invention will now be described with reference to the accompanying drawings, in which:

FIGS. 1A–1C are sections through a pair of plates being joined together;

FIG. 2 is a view similar to FIG. 1A but with a modified consumable;

FIG. 3 is a section illustrating the holding together of a material subject to laminar tearing;

FIG. 4 illustrates a friction repair technique in which the bore has radial cavities;

FIG. 5 is a section illustrating a further friction plug welding technique;

FIGS. 6–9 illustrate a preformed cavity and different geometries of consumable for use with the cavity respectively.

FIG. 10 illustrates a modified form of consumable;

FIG. 11 and 12 illustrate a series of overlapping plugs;

Figure 13:
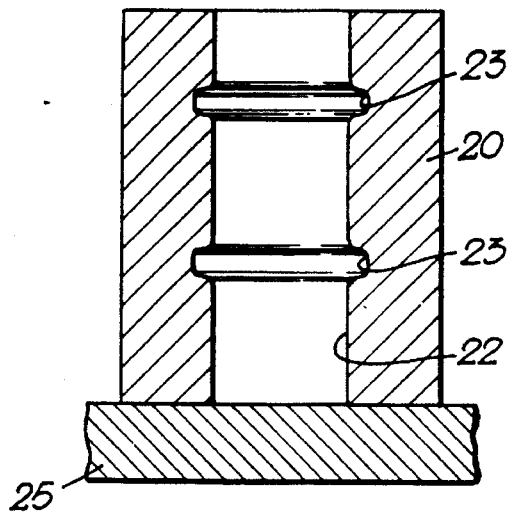
FIGS. 13–16 illustrate a friction moulding technique.

FIG. 1A shows a hole 1 nominally 21.5 mm diameter in a pair of carbon steel plates 2,3 each of 25 mm thickness where the hole does not extend through the entire plate thickness. A consumable rod 4 of nominally 20 mm diameter in, say, mild steel, is inserted in to the cavity coaxially while being rotated, for example, at 1300 rpm (peripheral velocity 1.34 m/sec) under a suitable applied load so as to generate a plasticised zone 5. Preferably, conditions are chosen such that the rate of burn off is significant and preferably in excess of 1 mm/sec for 20 mm diameter bar leading to plasticised material production at a rate in excess of some 1000 mm³/sec. Higher rates can be obtained if desired, particularly by reducing the rotational speed to the order of 0.4 m/sec peripheral velocity. However, to obtain good bonding in the cavity, it is preferable to use less than the highest possible rates of formation and to maintain a relatively high load so as to develop a significant degree of hydrostatic pressure in the plasticised region while maintaining it at a temperature close to the bulk melting point of the material concerned. For example, a rotational speed of 830 rpm (0.85 m/sec). Preferably, the temperature is in excess of 90% of the melting point in degrees Kelvin. The upper end of the cavity 1 so filled in the friction plug extrusion technique normally lies a little below the top surface of the cavity (FIG. 1B). Where it is desirable to extend the plug flush with the nominal top surface of material being filled a small cover plate 60 can be added as shown in FIGS. 1A and 1B of some 2–3 mm thickness which enables the plasticised material to be brought to the top surface of the main plate 2. The cover plate 60 and any excess plasticised material is then machined or ground off to leave a flush surface as desired (FIG. 1C).

In a further general arrangement the plug member 4 forming the plasticised material filling the hole 1, may be provided with a shoulder 4' see FIG. 2, which serves to cap the filled aperture. The plasticised material 5 extrudes and bonds the sidewall of the hole as previously described, but before the pressurised material expels into the open environment (or just as it starts to expel) the shoulder 4' contacts the upper surface 2' and bonds in the manner of a conventional friction Weld or stud to plate weld, and the rotation is terminated.

Furthermore in a semi-automatic arrangement, the cross-section of the shaft 4 may be reduced below that of the shoulder section (but sufficient to maintain the torque of the friction process, both initially and during the plasticised stage where the material fills the aperture) such that it shears on completion of the friction bond to the shoulder. Normally on completion of a friction weld, especially as the rotational speed begins to fall, there is a major peak in the torque which is significantly greater than the nominal equilibrium torque in friction welding. This greater torque results in shearing the drive shaft and hence causes sudden arrest of the rotating shoulder so that it bonds to the substrate and seals the plasticised material in situ.

FIG. 3 illustrates a method similar to that shown in FIG. 1 and 2 but in this case for repairing laminar separations 71 in a workpiece 70.

FIG. 4 illustrates a further variant in which circumferential grooves 6 are provided in the workpiece 72 to provide a key for the plug 7 which may be of a dissimilar material.

FIG. 5 illustrates a further technique in which a plug 8 is formed in a bore 9 of a workpiece 10 sitting on a workpiece 11 to which the plug is friction welded. In other examples, this technique could be used simply to fill the bore 9 in the workpiece 10, the member 11 serving as a temporary backing plate which is subsequently removed.

FIG. 6 illustrates a cavity or bore 12 in a workpiece 13, the lower end of the cavity 12 being tapered at 14. The tapered end 14 is provided where a reactive support cannot be used and typically the consumable 15 will also have a tapered end 16 (FIGS. 7–9). The relative taper angles can be adjusted as necessary and different relative tapers are shown in FIGS. 7–9. In FIG. 7 the taper angle of the consumable 15 is less than that of the workpiece. In FIG. 8 the taper angles are the same. In FIG. 9 the taper angle of the consumable 15 is greater than that of the workpiece.

FIG. 10 illustrates a modification of the consumable 15 in which an annular flange 17 is provided to define an initial contact area with the cavity 12.

In the case of crack repair where the crack extends substantially to the full depth of the parent material, the drilled hole has a shoulder such as shown in FIGS. 6–10 against which the consumable member bears in operation. This results in a limited amount of extruded material forming on the underside as well as the plasticised material filling the cavity as previously described. The excess material on the far side can, if desired, be machined or ground off leaving a flush finish.

The friction plug extrusion technique can be used to stop and fill long cracks in castings or thick sheet. Here a series of spaced holes 18 (FIGS. 11 and 12) are drilled through the material or to the depth required for a non-thickness crack. The friction plug extrusion technique is then used to fill the blind or semi-blind holes 18 as previously described and then the intermediate spaces are drilled 19 and filled to produce a continuous plug fill along the line of the crack.

In all these cases it is observed that the plasticised material developed by relative motion under applied load is caused to form and to consume the consumable member such that the latter bonds to and virtually comprises the plasticised material. It is noted that the consumption rate of the consumable with respect to forming the plug is greater than the burn off rate per se as the plasticised material is caused to rise up against the direction of applied forward movement of the consumable member. For example with a bar of nominally 20 mm diameter rotating at 1300 rpm and feeding forward at 1 mm/sec into a cavity of some 21.5 mm diameter the latter is filled to a depth of 40 mm in some 15 seconds. Thus the overall rate of advance of the consumable with respect to the frictional interface is the sum of these two speeds, viz around 3.7 mm/sec. Similarly with the same bar rotating at 830 rpm and forward feed of around 3 mm/sec the plasticised layer fills the cavity in about 5 seconds, giving a combined rate of the build up with respect to the consumable of over 10 mm/sec.

In a further example a stainless steel tube of internal diameter 24 mm and held in a suitable support mould is filled with an aluminium alloy to result in a stainless steel clad plug formed from the plasticised material. Here the aluminium member is nominally 22 mm diameter giving about 1 mm clearance gap and rotating at about 860 RPM (peripheral speed about 1 meter/sec) with a forward feed of around 2.2 mm/sec. Under these conditions a cavity 250 mm long is filled in under 20 seconds giving a combined rate of fill with respect of the advancing consumable of nearly 15 mm/sec.

Unlike conventional friction welding a relatively large quantity of plasticised material is formed and, if it occurs, the zone-of bonding is between the plasticised material and the surrounding cavity. Also unlike friction surfacing the substrate containing the cavity is not translated with respect to the consumable member in a direction normal to its axis. Also, the bond between the plasticised material and the substrate forming the cavity lies in a plane parallel to the axis of the consumable member and in general the area of bond is considerably in excess of the area presented by the cross-section of the consumable member.

Preferably, the materials used for filling contain crack arresting agents such as a zirconia loaded metal matrix. This can be produced by using a consumable bar of material similar to the plate or casting in which the crack is to be drilled out together with inserts in the consumable containing particulates of the desired composition such as zirconia. During frictioning, the particulates are re-distributed in the matrix to form a suitable MMC which enhances the capability of the original parent to withstand fatigue crack extension due to loading in service. Alternatively, a suitable MMC type material can be used for the consumable, with or without additional material provided in inserts.

Figure 16:
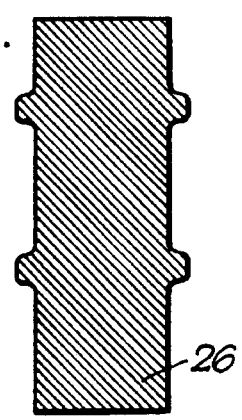
Figure 15:
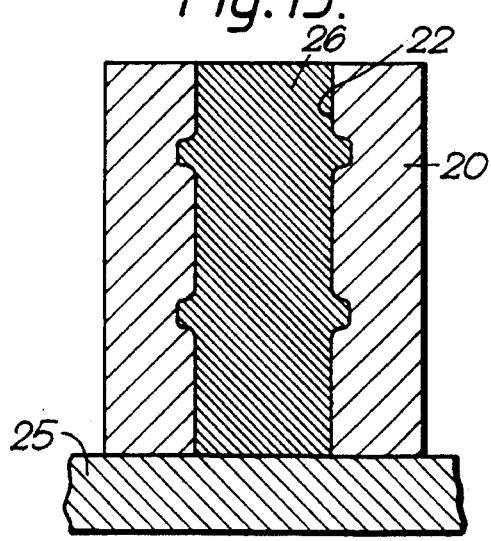

FIGS. 13–16 illustrate a friction moulding technique. In this technique, a two part mould 20,21 defines the "workpiece" with a central, circular bore 22. A pair of circumferential grooves 23 are provided in the wall of the mould. The mould parts are held together by bolts 24 and bear against a support-surface 25. A consumable (not shown) is inserted into the cavity 22 and a friction extrusion process similar to that described in connection with FIG. 1 is carried out to fill the cavity 22 with a solidified plug 26. The mould parts 20,21 are then removed to leave the moulded plug 26 (FIG. 16).

Figure 13A:
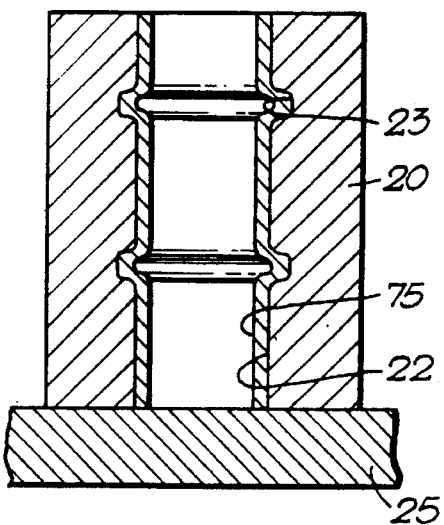
FIGS. 13A and 16A are views similar to FIGS. 13 and 16 but showing a sheathing technique.
Figure 16A:
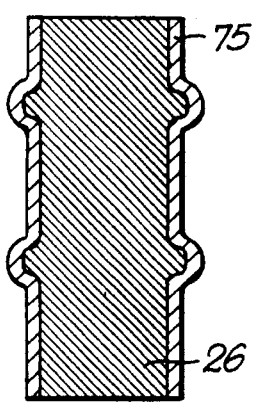

A modification of the technique shown in FIGS. 13–16 is friction forming in which an additional sheath of metallic material 75 (FIG. 13A) is provided in the cavity 22 so that following the friction extrusion process, the sheath is moulded into the grooves 23 and provides a cladding around the final plug 26 (FIG. 16A).

Figure 13B:
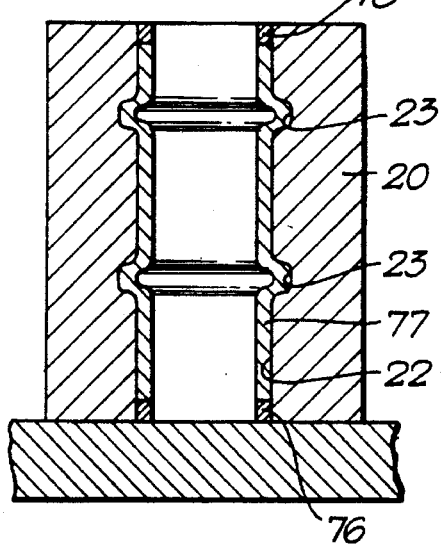
FIGS. 13B and 16B are views similar to FIGS. 13 and 16 but showings cladding technique.
Figure 14:
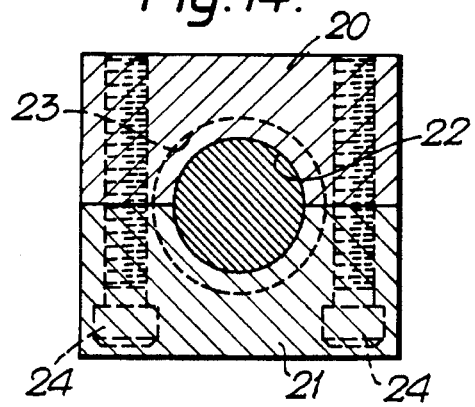
Figure 16B:
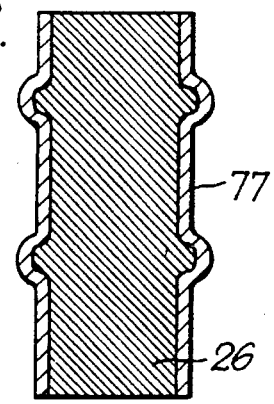

A friction cladding technique using the mould arrangement of FIGS. 13–16 can also be used. In this case, an annular, sacrificial spacer 76 (FIG. 13B) is positioned at the lower end of the cavity 22 supporting an annular sheath 77 above which is provided a further sacrificial spacer 78. Friction extrusion processing occurs as before to generate a plug 26 within the sheath 77 so that upon removal of the mould parts, a sheathed plug is produced (FIG. 16B). The axial ends of the plug may be machined to form axles which alternatively may have been moulded by suitably shaped spaces.

Figure 17:
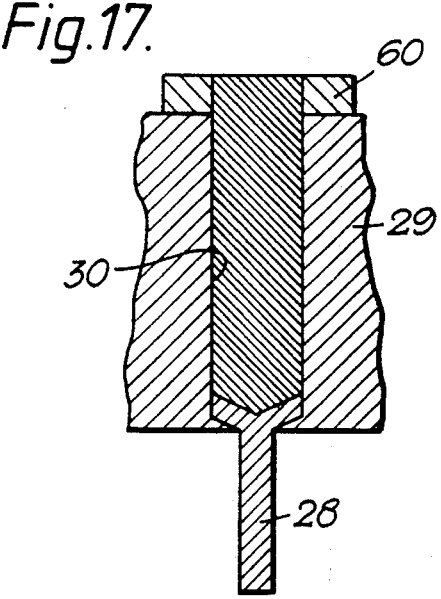
FIGS. 17 and 18 illustrate the formation of a plug behind a dowel and the dowel itself respectively.
Figure 18:
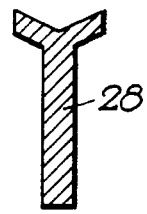

The technique can be extended to plug fixing attachments as, for example, setting a dowel 28 (FIGS. 17 and 18) in the wall 29 of a furnace. As illustrated in FIG. 17 the component is trapped in a re-entrant bore 30 in the plate forming the furnace wall 29 and by friction plug extrusion the dowel 28 is consolidated in place and bonded by the deposited plasticised material with respect to the wall of the bore. Instead of a square ended head to the dowel or attachment the head can be chamfered and fit within a correspondingly chamfered bore hole. In operation the applied load causes the head to spread and develop an interference fit in the chamfered bore as well as being locked by the plasticised material in the bore as previously.

Figure 19:
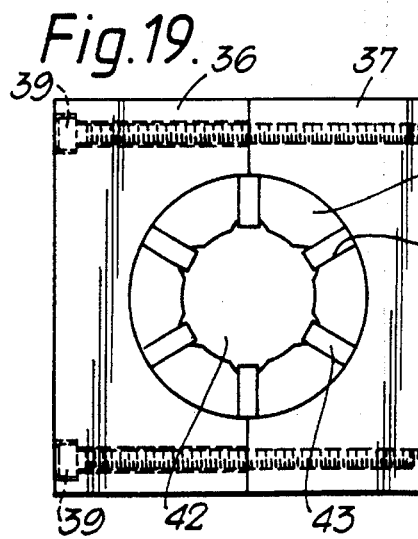
FIGS. 19 and 20 illustrate the formation of a tool with helically extending blades.
Figure 20:
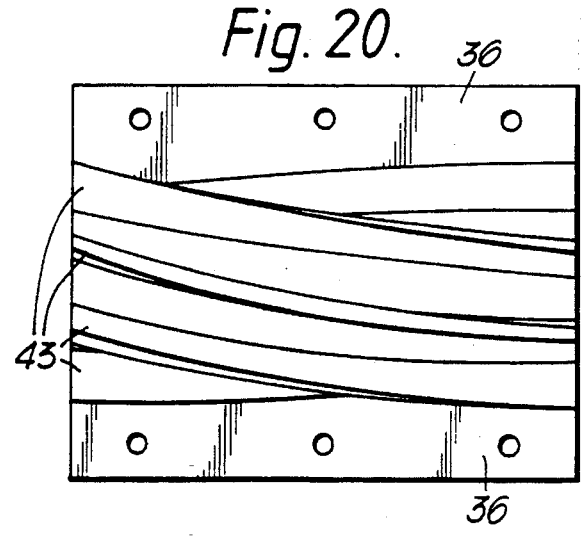

The technique is particularly suited to the formation of tools with blades and one example of that construction is shown in FIGS. 19 and 20. In this case, a two part mould 37,36 is provided defining a circular bore 38 and held together by bolts 39. A mould member 40 having a set of elongate, rectangular cross-section, helically extending grooves 41 is inserted in the cavity 38 and in use, material is friction extruded into an inner cavity 42 defined by the mould part 40. Plasticised material will partially enter the grooves 41 containing blades 43 so that after solidification a tool is formed having a cylindrical core 42 and a set of elongate blades 43.

Figure 21:
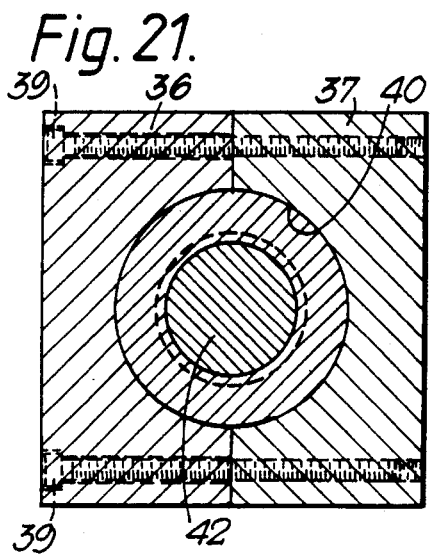
FIGS. 21 and 22 illustrate the formation of a tool with circumferential blades.
Figure 22:
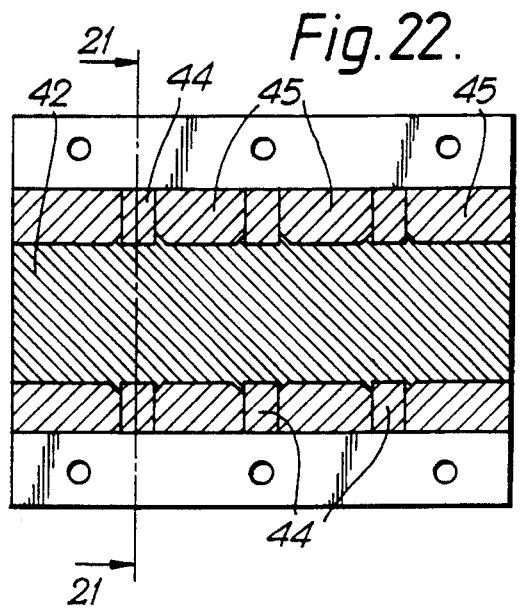

FIGS. 21 and 22 illustrate yet another variation on this theme in which a set of annular blades 44 are entrapped as a result of providing a set of axially spaced mould parts 45 within the cavity 40.

Figure 24:
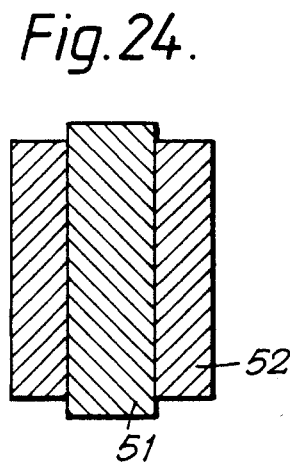
FIG. 24 illustrates an externally clad shaft.
Figure 25:
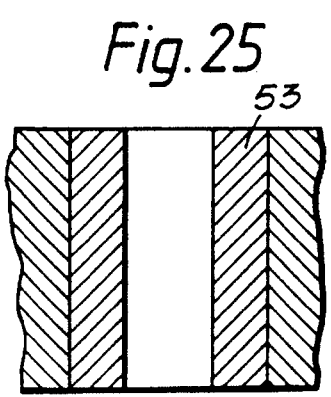
FIG. 25 illustrates the formation of an internal cladding.
Figure 26:
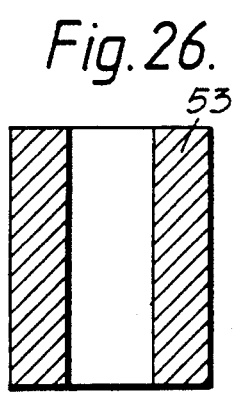
FIG. 26 illustrates a tubular plug-like member formed using the method shown in FIG. 23.

In the examples described so far, the consumable has had a solid cross-section. FIGS. 23 to 26 illustrate an example in which the consumable 46 is annular and is inserted into a bore 47 in a workpiece 48 which contains a central reusable or sacrificial core 49. The friction extrusion process will cause plasticised material 50 to build up around the core 49 so that after solidification and removal of the mould 48 and the core 49, a cylindrical tubular member is produced (FIG. 26).

A modification of this process is to replace the core 49 by a shaft 51 which remains in situ after friction extrusion so that the friction extrusion material 52 defines a cladding around the shaft. (FIG. 24)

In another application, the core 49 may be used to cause the friction extruded material to form an internal cladding 53. (FIG. 25)

Figure 23:
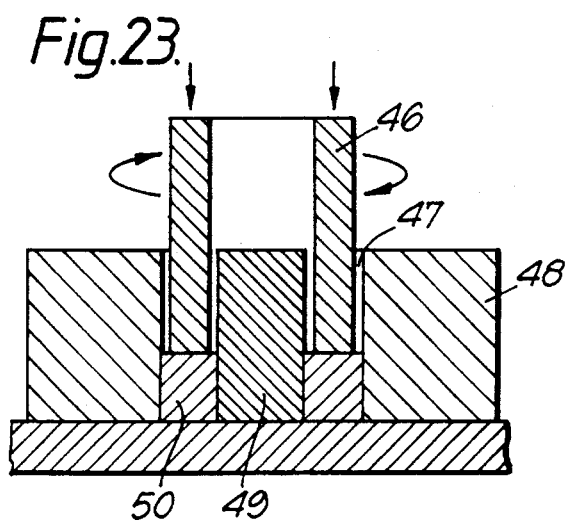
FIG. 23 illustrates the formation of a tubular plug-like member.
Figure 27:
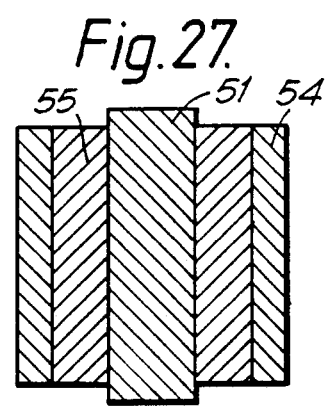
FIG. 27 illustrates a composite assembly having a core shaft surrounded by friction extrusion material and an outer cylinder.

FIG. 27 illustrates a composite assembly in which a technique similar to that shown in FIG. 23 has been used with the core 49 replaced by a shaft 51 and the mould 48 defined by an outer cylinder 54 so that the friction extruded material 55 bonds the outer cylinder 54 to a shaft 51.

Figure 28:
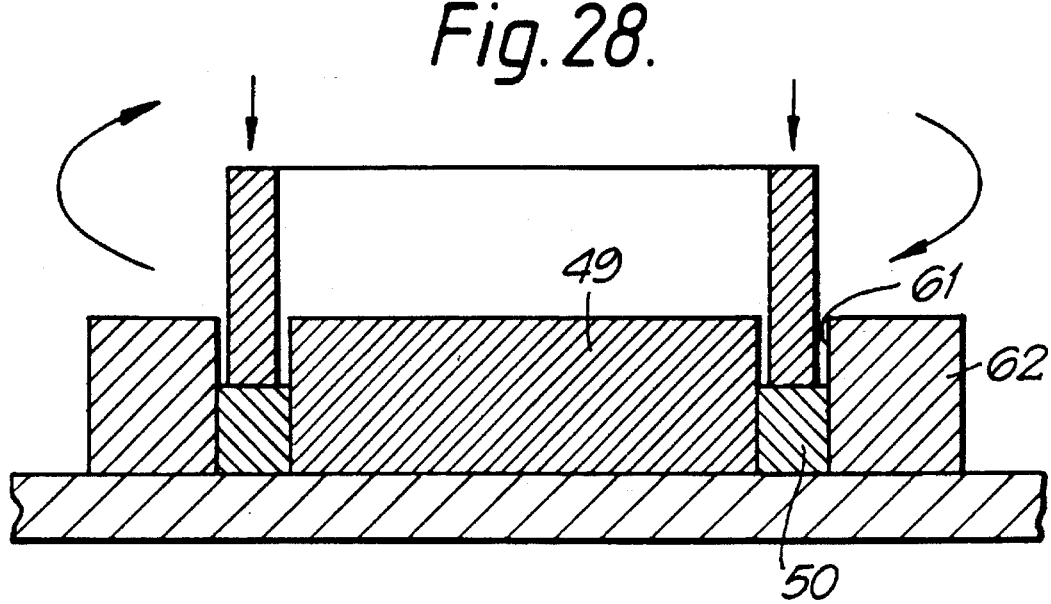
FIG. 28 illustrates a further tubular plug-like member for retaining and supporting radial elements such as turbine blades.
Figure 29:
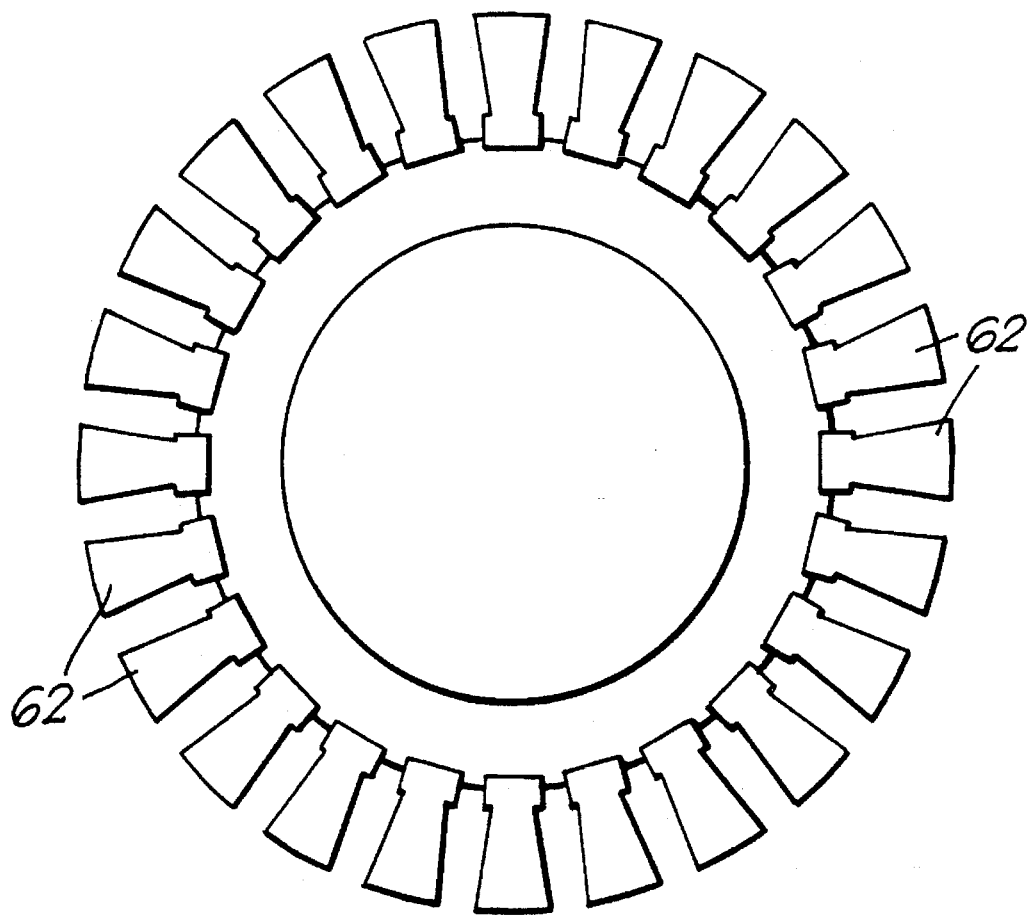
FIG. 29 illustrates a completed blade ring using the method of FIG. 28.

FIG. 28 illustrates an assembly in which a technique similar to that shown in FIG. 23 has been used with the core 49 and a surrounding cavity 61 defined by a set of components 62 which may for example be the bases of turbine blades together with mould separation plates, to make a turbine blade ring as shown in FIG. 29. The friction extrusion process causes plasticised material 50 to build up around the core 49 so that after solidification and removal of the core 49 a ring like member is produced (FIG. 29).

Figure 30A:
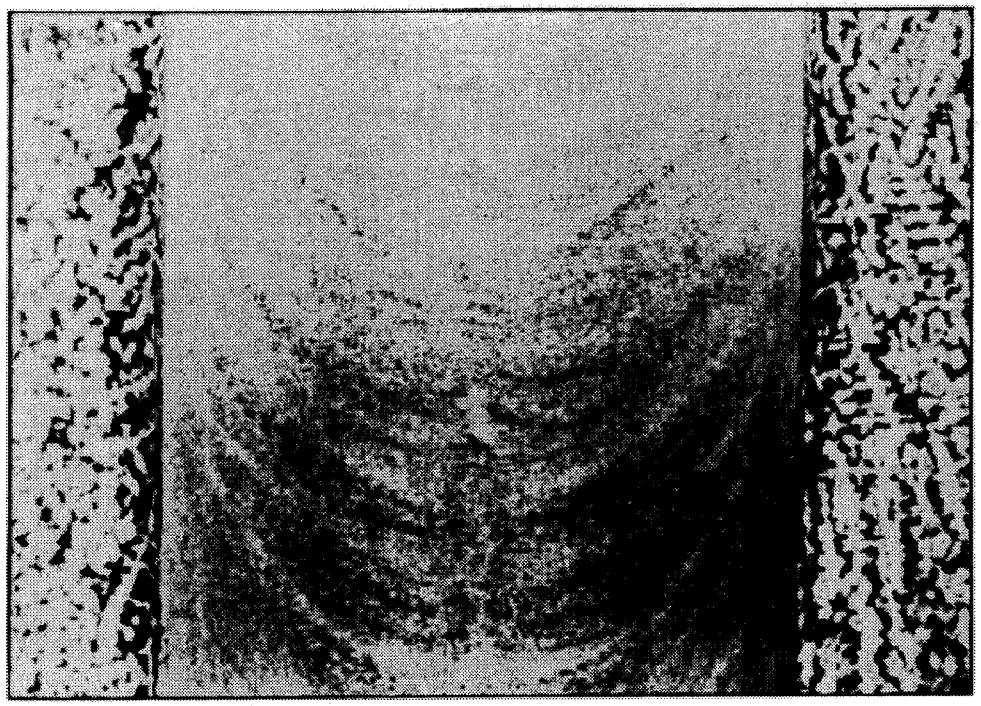
FIGS. 30A–30C are photographic sections through finished products.
Figure 30B:
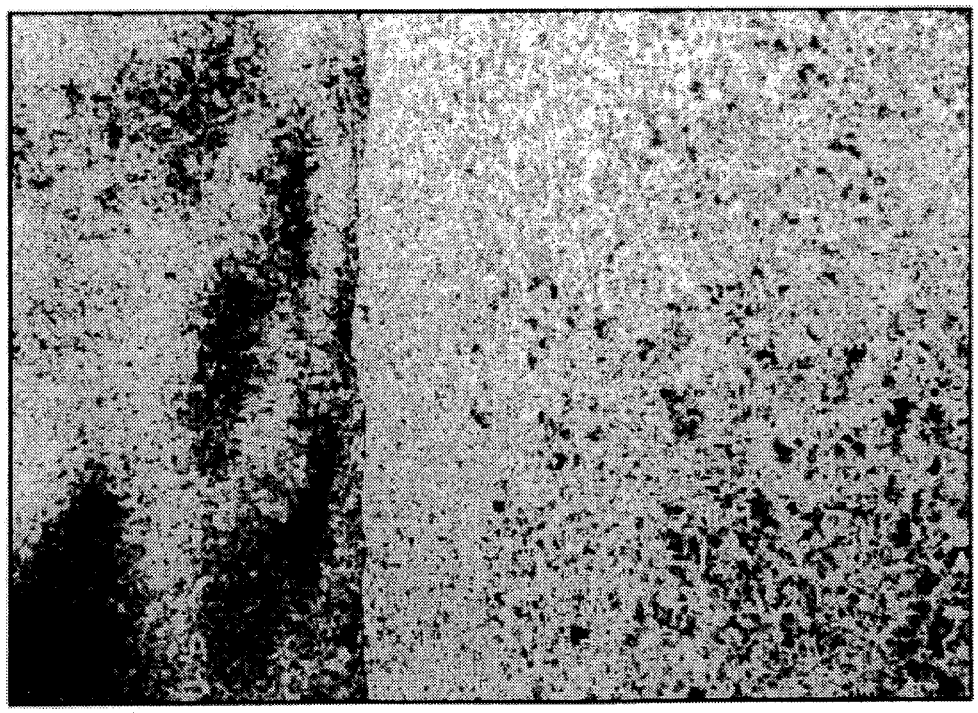

The formation of the plasticised material and its bonding to the side wall of the cavity is indicated by the sections shown in FIGS. 30A and 30B. For a simple cylindrical cavity such as in FIG. 1, the end of the rotating consumable develops a partially spherical profile during the process of forming and depositing the plasticised material. This partially spherical profile is indicated by the striations in the macro-section through a deposit (FIG. 30A). Clearly the deposited material has a much finer grain structure than that of the relatively coarse parent plate—in this example cast mild steel.

It should be noted that the partially spherical form differs markedly from the nominally flat or shallow curved profile of conventional friction welding or friction stud to plate welding. The spherical form is indicative of developing a hydrostatic pressurised zone in the plasticised material as it is being formed in the surrounding cavity.

Figure 30C:
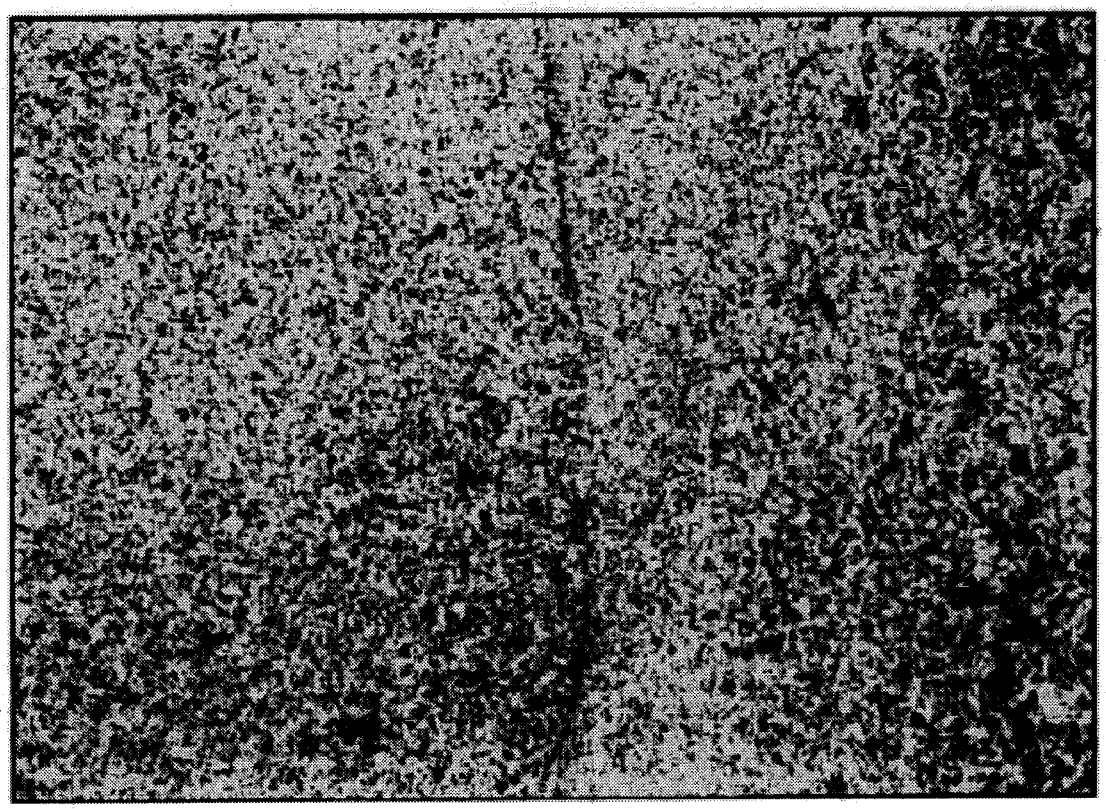

Under suitable conditions of pressure and temperature the plasticised material bonds to the parent substrate material without significant lack of bond (flat spot) regions. This is illustrated in FIG. 30B for a mild steel consumable in cast steel plate where the microsection shows fine grain formation for the plasticised material, and the immediate contact zone of the parent plate. For many similar pairs of the materials the actual bond region is not clearly distinguishable, compared with the above example where the bond zone is indicated by the change in grain structure. Furthermore where the plasticised material is bonded to a previously deposited material as in the linear array of FIG. 11 the bond zone is scarcely distinguishable in the fine grain structure of the materials as deposited, see the micro-section of FIG. 30C.

These and other variations in geometry and application are within the scope of the invention in which plasticised material formed by the friction heating process by relative movement between a consumable member and substrate under relative applied load is caused to extrude and conform to a surrounding cavity to which the plasticised material generally bonds.

It is to be noted that although there are limits (depending on the materials and operating conditions) to the gap between the consumable and the side wall of the cavity into which it is being deposited, the gap is relatively uncritical. In general, however, the longer the bore, the larger the gap required. For example, for a mild steel bar 20 mm in diameter and rotating at about 830 Rpm, with a forward feed of some 2 mm/sec, the radial gap can extend from as little as 0.5 mm to over 4 mm. With too small a gap the rotating shaft tends to seize in the hole as its extremity is frictionally heated. Conversely with too large a gap the process breaks down and tends towards friction surfacing with the frictional interface remaining static at the contact zone with substrate, and with the flash tending to form back along the bar.

For steel material the radial gap is preferably in the range 0.75 mm to 3 mm. To reduce excess consumption of material the gap should not be more than say 25% of the radius for a solid round bar (or half the thickness of a tubular consumable), and preferably should not be more than the order of 10%–15%. Thus for a 20 mm steel bar the preferred radial gap is in the range 0.75 mm to 1.5 mm. Typically the radial clearance can be of the order of for a range of bar diameters from less than 10 mm to over 30 mm. Where suitable the cavity into which the plasticised material is deposited can be tapered—such as with the larger diameter at the base where the consumable member first contacts (and hence the smaller diameter at the upper surface to the substrate) within the dimensional limits for the materials and operating conditions.

Bores to a depth of 12" (30.5 cm) have been filled using this technique.

We claim:

1. A method of forming a plug-like member, the method comprising placing a consumable member (4) in a bore (1) of a substrate (2), wherein said bore defines a wall around said consumable member, and wherein a clearance is left between said consumable member and said wall; causing relative movement between the consumable member (4) and the substrate (2) while urging them together to generate frictional heat and fully plasticising said consumable member across said bore in a plasticised region which progresses along the consumable member in a direction opposite to the urging direction; allowing the plasticised material (5) to solidify so as to form the plug like member having an outer surface conforming to the inner surface of at least part of the bore (1); and either leaving the plug-like member in situ or, following formation of the complete plug-like member, removing the substrate.

2. A method according to claim 1, wherein the substrate comprises a pair of plates (2,3), the bore (1) extending through one plate and into the other, and the plug-like member being left in situ whereby the plates are joined together.

3. A method according to claim 1, wherein the substrate comprises a partially delaminated member (70), the bore extending through the laminae, and the plug-like member remaining in situ to consolidate the laminae.

4. A method according to claim 1, wherein the bore includes a tubular member (75) lining the bore whereby the plug-like member bonds to the tubular member which forms a sheath or cladding.

5. A method according to claim 1, wherein the end of the bore against which the consumable member bears is defined by a dowel (28) to which the plasticised material bonds.

6. A method according to claim 1, wherein the substrate defines a mould which is so shaped that the plug-like member is formed as a blade carrying member.

7. A method according to claim 1, wherein the consumable member has a solid cross-section.

8. A method according to claim 7, wherein the consumable member includes an insert of a different material, whereby the plug-like member is formed as a MMC.

9. A method according to claim 1, wherein the consumable member (46) is tubular, the method further comprising positioning a core member (49) within the consumable member.

10. A method according to claim 9, wherein the consumable member bonds to the core member.

11. A method according to claim 1, wherein the bore (22) includes at least one radially outwardly facing cavity (23).

12. A method according to claim 1, wherein the open end of the bore through which the consumable member is inserted is defined by a sacrificial member (60) which is removed after use, the method further comprising machining the portion of the plug-like member protruding into the sacrificial member after the sacrificial member has been removed.

13. A method according to claim 1, wherein the consumable member includes a shoulder (4') which, towards the end of the process, abuts against the end of the bore through which the consumable member is inserted.

14. A method according to claim 1, wherein the end of the bore towards which the consumable member is urged presents a tapering surface to the leading end of the consumable, the leading end of the consumable member also being tapered.

15. A method according to claim 1, comprising forming a series of overlapping plug-like members (18, 19) whose centres are laterally spaced.

16. A method according to claim 1, wherein the relative movement between the consumable member and the substrate is achieved by rotating the consumable member relative to the substrate.

17. A method according to claim 1, wherein the plug-like member is a metal matrix composite.

18. A method according to claim 1, wherein the plug-like member has a thickness of at least 3 mm.

19. A method according to claim 1, wherein the plug-like member has a thickness of at least 10 mm.

20. A method according to claim 1, wherein the plug-like member has a thickness of at least 30 mm.

21. A method according to claim 1, wherein said clearance is about 1 mm.

22. A plug-like member which has been formed by placing a consumable member in a bore of a substrate, wherein said bore defines a wall around said consumable member, and wherein a clearance is left between said consumable member and said wall; causing relative movement between the consumable member and the substrate while urging them together to generate frictional heat and fully plasticising said consumable member across said bore in a plasticised region which progresses along the consumable member in a direction opposite to the urging direction; allowing the plasticised material to solidify so as to form the plug like member having an outer surface conforming to the inner surface of at least part of the bore; and either leaving the plug-like member in situ or, following formation of the complete plug-like member, removing the substrate.

* * * * *